United States Patent [19]

Miller et al.

[11] Patent Number: 4,517,264
[45] Date of Patent: May 14, 1985

[54] LIGHTWEIGHT METAL-HYDROGEN CELL WITH IMPROVED PLATE STACK SUPPORTING MEANS

[75] Inventors: Lee E. Miller, Carl Junction; Dennis D. Carr, Jasper, both of Mo.; Donald L. Smith, Miami, Okla.

[73] Assignee: Eagle-Picher Industries, Inc., Cincinnati, Ohio

[21] Appl. No.: 525,986

[22] Filed: Aug. 24, 1983

[51] Int. Cl.³ ............................................ H01M 2/00
[52] U.S. Cl. .................................... 429/163; 429/27;
   429/174; 429/181; 429/185
[58] Field of Search ................... 429/163, 21, 27–39,
   429/34–39, 178, 181, 185, 174

[56] References Cited

U.S. PATENT DOCUMENTS

| | | | |
|---|---|---|---|
| 2,997,518 | 8/1961 | Klopp et al. | 429/27 |
| 3,841,914 | 10/1974 | Boyle et al. | 429/163 X |
| 4,038,461 | 7/1977 | Warnoch | 429/21 |
| 4,115,630 | 9/1978 | Van Ommering et al. | 429/72 |
| 4,189,527 | 2/1980 | Stadnick et al. | 429/27 X |
| 4,400,447 | 8/1983 | Gerenser | 429/27 |
| 4,430,390 | 2/1984 | Fekete | 429/34 |
| 4,431,714 | 2/1984 | Myerhoff | 429/37 X |

*Primary Examiner*—Charles F. Lefevour
*Attorney, Agent, or Firm*—Wood, Herron & Evans

[57] ABSTRACT

A metal-hydrogen cell is disclosed in which the durability of the battery is substantially increased and the system mass and volume are reduced. A plate stack within the casing is compressed by a spring which is supported from the casing without support from the terminals. The spring support is external to the cell stack; that is, it does not pass through the stack. Optionally, terminals are positioned at non-axial positions on the casing, extending outwardly from each domed end of the casing at axially offset positions on the domed ends so that the terminals do not extend beyond the length and diameter of the casing. This contributes to the reduction in the effective size of the cell.

7 Claims, 9 Drawing Figures

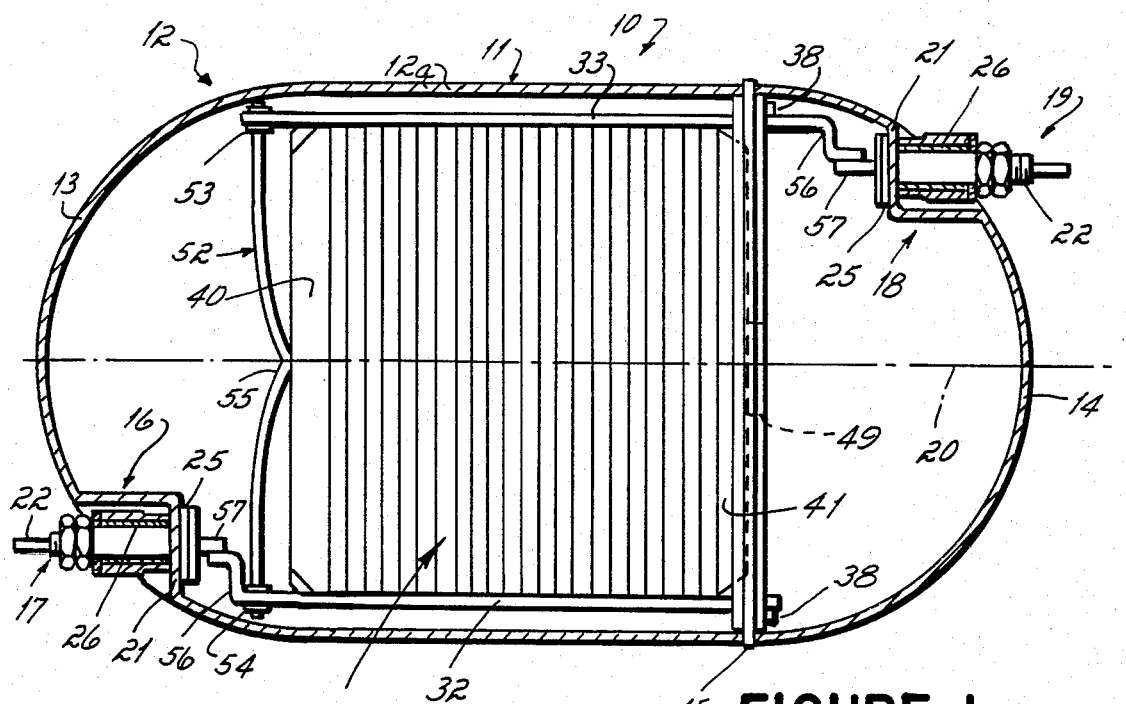
FIGURE 1
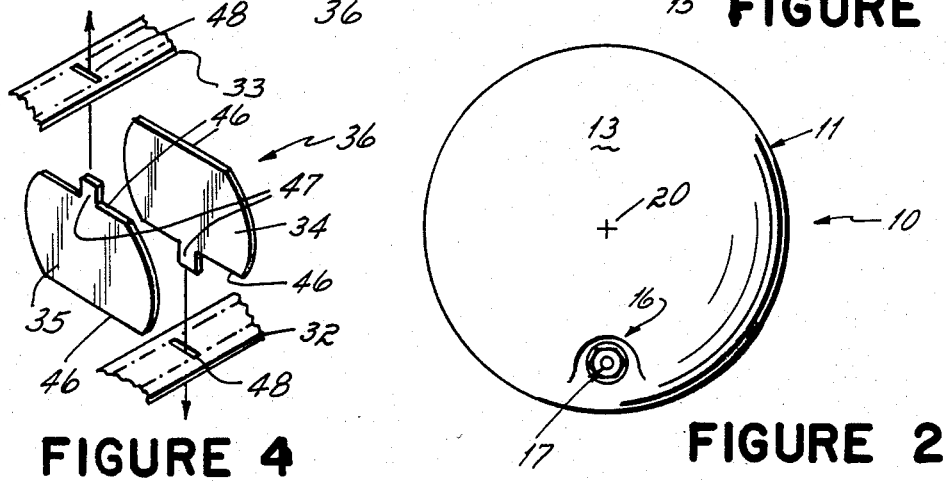
FIGURE 4
FIGURE 2
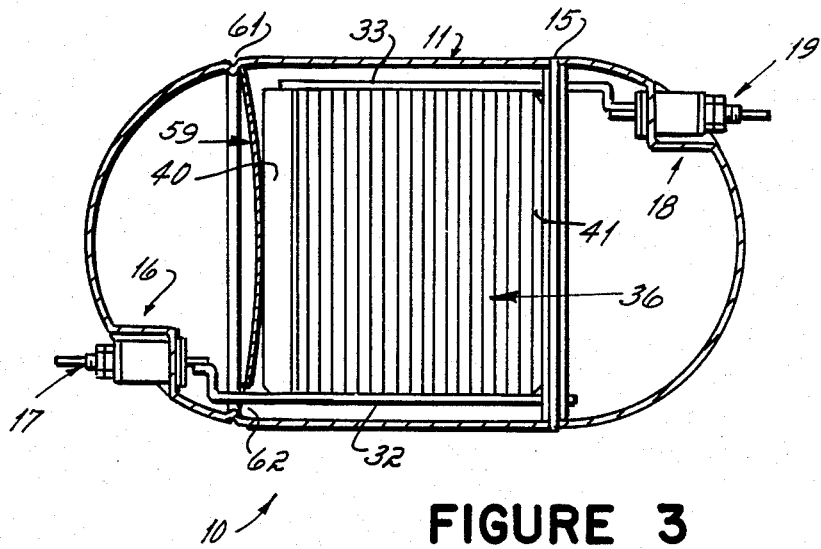
FIGURE 3

LIGHTWEIGHT METAL-HYDROGEN CELL WITH IMPROVED PLATE STACK SUPPORTING MEANS

BACKGROUND OF THE INVENTION

The present invention relates to the mechanical structure of a pressurized battery or cell. More particularly, the present invention relates to an improved structure for a cell such as a nickel-hydrogen cell.

Metal gas cells such as nickel-hydrogen cells are known in the art. Such cells are contained in sealed vessels or casing which contain hydrogen gas under high pressure. Each cell has at least one nickel-containing positive electrode which is spaced from a hydrogen-forming negative electrode. The electrode generally are in the form of plates which are stacked as a plate stack. The stack also includes gas diffusion plates and separators which prevent short circuiting contact between the electrodes, and which hold a sufficient quantity of electrolyte for desired cell performance.

The electrolyte is typically an alkaline medium such as an aqueous solution of alkali metal hydroxide, generally an approximately 30 percent potassium hydroxide solution. The negative (hydrogen-forming) electrode is a plastic bonded, metal power plate. The metal powder is preferably one such as platinum or palladium which will catalyze a hydrogen dissociation reaction in the aqueous electrolyte. The plastic bonding material is desirably tetrafluoroethylene such as "Teflon" brand material made by duPont. The active material of the positive plate is generally a nickel-oxy-hydroxide.

The pressure vessel or casing is generally maintained at super-atmospheric pressure, for example a pressure in the range of 20 to 50 atmospheres. Hydrogen in the vessel diffuses through a diffusion mesh of Teflon or the like to reach the catalytic negative electrode or anode. The anode causes molecular $H_2$ to dissociate into atomic hydrogen which in turn reacts with free hydroxyl groups to form water plus free electrons. The water and the free electrons react with the nickel-oxy-hydroxide positive to form nickel hydroxide plus free hydroxyl groups. Reverse reaction occur during charging. Ni-$H_2$ cells currently in use have a cylindrical casing with domed ends, to withstand the internal gas pressure. Internally, the plate stack is supported and compressed by a nut or other stop on a retaining pin or rod which extends through a central or axial aperture in the stack. Axial terminals project outwardly from the centers of the domed ends of the casing. The terminals support the retaining rod and the cell stack in the casing. In another prior art construction the plates are compressed by a spring on a central rod on which they are stacked and which is again supported by axial terminals.

Ni-$H_2$ batteries are quickly becoming the preferred electrical storage system for earth-orbiting satellites. The reasons for this are the long life of the Ni-$H_2$ cell, its wide operating temperature range and most importantly, its high energy density.

Due to the expense of these satellites, the chance of cell failure must be absolutely minimized. The cells must be designed to be durable and withstand the forces encountered when the satellite is launched. Further, it is also critical that the mass and volume of these cells be as low as possible.

In such Ni-$H_2$ cells the compression of the plate stack on a central rod on which they are stacked and which is in turn supported on axial terminals, leads to relatively great mass and volume of the battery, and places stress on the terminals. This makes such cells more prone to failure. Further, the axial location of the terminals increases the overall mass and volume of the system.

BRIEF DESCRIPTION OF THE INVENTION

It is an object of the present invention to provide an improved structure for a metal (or metal oxide) gas cell, such as a Ni-$H_2$ cell.

Further, it is an object of the present invention to improve the durability of such cells and to reduce their overall size and weight without reducing energy density.

In accordance with the invention, the plate stack is compressed axially by a spring which is supported by means external to the stack and which does not extend along the axis of the casing. The spring is supported laterally from the casing, not axially from the terminals. This provides much better support under vibration as is encountered in satellite launchings. The spring is preferably a Belleville washer type spring, which is seated at its outer edge against a recess or stop presented by the casing interior surface. Alternatively, the spring is connected and supported between bus bars on either longitudinal side of the plate stack, and the bus bars are in turn supported by a stack support at the end of the stack which is secured to the center portion of the casing.

The invention can best be further described by reference to the drawings, in which:

DESCRIPTION OF THE DRAWINGS

FIG. 1 is a axial section of one embodiment of a metal gas battery according to the present invention;

FIG. 2 is a plan view of one domed end of the battery shown in FIG. 1;

FIG. 3 is a cross sectional view of an alternative embodiment of the present invention;

FIG. 4 is a diagrammatic illustration of the electrode-bus bar connections of the battery;

DETAILED DESCRIPTION

Figure 5:
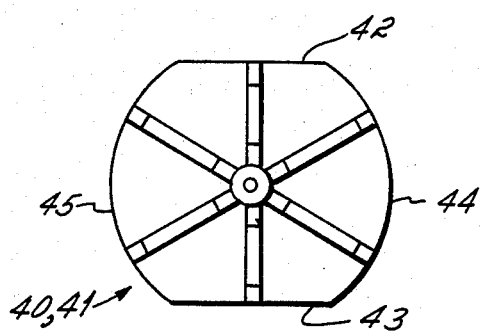
FIG. 5 is a plan view of an end plate of the cell stack.

A metal gas cell, such as a nickel-hydrogen battery, includes a plate stack which is a plurality of alternating negative and positive electrodes connected to a negative and a positive bus bar, respectively. The bus bars in turn are connected to terminals which extend through a casing which contains the pressure of the operating gas of the cell.

In FIG. 1 there is shown a nickel-hydrogen cell 10 including an external casing 11. The casing is preferably made from a hard metal such as Inconel 718, an alloy principally composed of about 52 percent nickel, 19 percent chromium and 18.5 percent iron produced by the International Nickel Company. The casing is a two-piece assembly, one section 12 comprising a cylindrical center portion 12a and a first domed end portion 13, the other section 14 including a second domed end. The two sections 12 and 14 are welded together to form a continuous casing at an Inconel weld ring 15 positioned between them. As will be seen, the weld ring 15 also comprises plate stack support means. The first domed end 13 of the casing includes an axially offset recess or pocket 16 adapted to receive a first or positive terminal 17. The second domed end of section 14 also includes an axially offset recess or pocket 18 adapted to receive a negative terminal 19. Both terminal pockets are non-axial, i.e., they are set off from the central horizontal axis 20 of the cell, on diametrically opposite sides thereof, as shown in FIGS. 1 and 2.

Terminal pockets 16 and 18 each include a flat base 21 providing a seat for the terminals 17 and 19, respectively. The terminals may be Nickel 200 rods 22 which extend through the respective bases 21. Each terminal is insulated from the housing by a polypropylene or Teflon washer 25 and an injection molded polypropylene sleeve 26.

The positive and negative terminals 17 and 19 are in turn connected to positive and negative bus bars 32 and 33, respectively. The bus bars connect to a series of positive and negative plates or electrodes, individually designated at 34 and 35, which are part of the plate stack 36. The plate stack also includes separators and gas diffusion mats, as is known in the art. These layers are held in facial contact with one another, between a positive end plate 40 and a negative end plate 41, which form the respective ends of the stack. As shown in FIG. 5, the end plates 40, 41 are simply insulative disks with flat opposed edges of chordal sections 42 and 43. These chordal sections 42 and 43 avoid interference with the bus bars when the stack is assembled, see FIG. 1. Rounded edges 44 and 45 of the end plates are adapted to engage the casing 11 and stabilize the stack in vessle section 12. These end plates are preferably molded plastic such as styrene-acrylonitrile copolymer, and maintain the plate stack out of electrical contact with the casing.

As shown diagrammatically in FIG. 4, the positive and negative electrodes 34 and 35 are thin, generally circular substrates with opposed flat edges or chordal sections 46. The chordal sections 46 provide clearance between the electrodes and the bus bars. The electrodes are connected to their respective bus bars by conducting interlocking tabs 47 which extend from chordal sections of the electrodes through slots 48 in the respective bus bars, and which are welded in place to provide electrical connection from the electrode to the bus bar.

Figure 6:
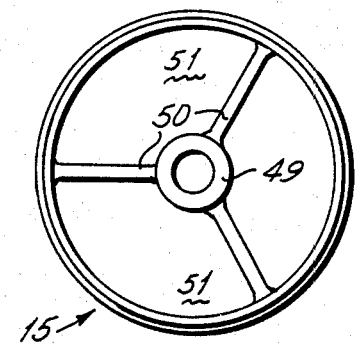
FIG. 6 is a plan view of a weld ring for use in the present invention.

One end of the plate stack is held in fixed relation to the casing by abutting the negative end plate 41 which is positioned against the weld ring 15. As shown in FIG. 6, the weld ring is an annular ring including a central hub 49 and axially extending spokes 50. The plate stack is in contact with the end plate 41 which in turn is in contact with the central hub 49 and spokes 50 of the weld ring. The open spaces 51 between the spoked provide clearance for the two diametrically opposite bus bars, which pass through them.

The plate stack is compressed and held securely in position against end plate 41 by a spring 52 which presses or is biased against the opposite (positive) end plate 40, so that the stack is compressed between the two end plates 40, 41. In the embodiment of FIG. 1, spring 52 is a preferably resilient metal panel or disk which extends from the positive bus bar 32 diametrically across the cell to the negative bus bar 33. A central detent or inbent portion 55 of the spring presses against end plate 40; about 30 pounds of force has been found sufficient in one example. The spring accommodates physical swelling of the plates, while maintaining substantially constant pressure on them. The ends of the spring are received in slots in the bus bars, but the spring is electrically separated from the bus bars by insulators 53 and 54. Each bus bar presents an insulated tab or stop 38 (see FIG. 1) which hooks over the edge of weld ring 15, so that the plate stack is compressed between the end plates and toward the weld ring, so that spring 52 holds the stack in fixed relation to the casing. The bus bars comprise spring mounting means, and act as tie rods, being placed in tension on each side of the plate stack by the force exerted by the spring.

Bent end portions 56 of the bus bars are connected to inwardly extending portions or spades 57 of terminals 17 and 19. These complete the electrical path from the negative to the positive terminal of the battery through the plate stack.

FIG. 3 shows an alternative, and presently preferred, embodiment of the invention wherein the spring clip 52 shown in FIG. 1 is replaced by an arcuate or "Belleville washer" spring 59 an outer edge which seats against an annular stop or recess 61 on the inside surface of casing 11. The spring is notched or cut away at one edge portion 62 to provide clearance for the bus bar 32. As shown in FIG. 3, in this alternative embodiment spring 59 is captured between the stop or recess 61 in the casing (which thus comprises the spring mounting means), and positive end plate 40, compressing the stack and forcing the stack toward the weld ring 15. By using an arcuate spring which is seated against an internal surface stop in the casing, the plate stack is stabilized by the casing wall, and the bus bars and terminals are not relied on for stabilization. As in the FIG. 1 embodiment, the spring mounting means is located between the plate stack and the casing, rather than being within the plate stack. The FIG. 3 embodiment is the preferred embodiment because it makes the cell more stable and less likely to fail due to dislocation of the plate stack or breakage of the bus bars or terminals.

Figure 7:
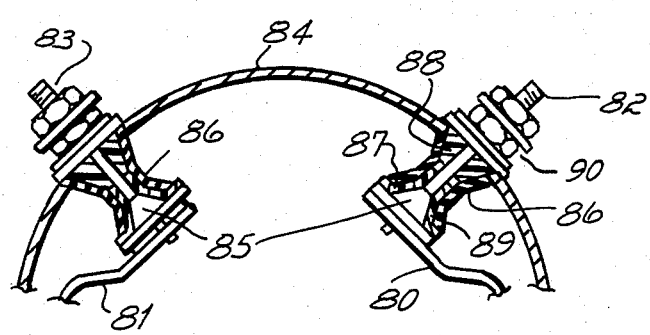
FIG. 7 is a partial axial section of an alternative form of terminal construction for use in the present invention.

FIG. 7 shows another alternative construction in accordance with the invention, wherein both terminals project radially but not axially from the same domed end, and are mounted by seals on the inside of the dome, rather than set in pockets on the outside as in the FIG. 1 embodiment. Like the other embodiments this modification avoids the axial terminals of the prior art, and provides a smaller "envelope" for the cell. In this embodiment, bus bars 80, 81, which may be similar to those previously described, are connected to the plate stack and extend angularly toward one another after passing through the weld ring, and are welded to the inner ends of terminals 82, 83. The terminals extend through openings in domed end 84, and are sealed by sealing structure positioned on the inside of the dome end. Each terminal has a conical inner end portion 85, which as the terminal is drawn up by nuts 90 compresses correspondingly tapered plastic (Teflon) seals 87 and 88. The seals 87 and 88 are captured in a surrounding Inconel sleeve 89 which is welded to the dome end.

Figure 8:
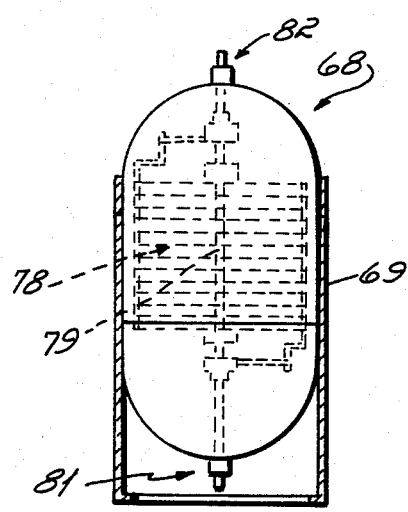
FIG. 8 is a vertical section of a prior art metal gas battery, set in a mounting sleeve.
Figure 9:
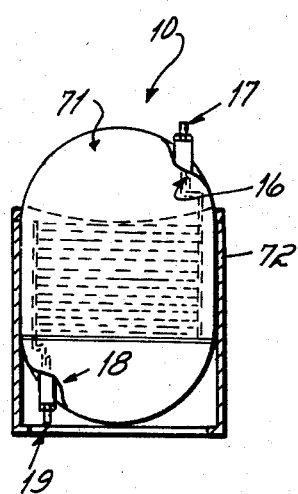
FIG. 9 is a comparative vertical section of a metal gas battery according to the present invention, set in a retaining sleeve.

A cell according to the present invention is sturdier, shorter, lighter and more easily heated and cooled than prior art Ni-H$_2$ cells of comparable capacity. For comparison purposes, FIG. 8 is presented which shows a cross section of a nickel-hydrogen cell 68 encased in a thermally conductive metal temperature control sleeve 69 of the type commonly used for mounting. Cell 68 does not incorporate the novel features of the present invention. FIG. 9 shows a nickel-hydrogen cell 71 incorporating the novel features of the present invention and housed in a conductive sleeve 72. A satellite would include an array of these cells housed in metallic, thermally conductive sleeves, such as sleeves 69 and 72.

Comparison of the cell 68 and mount shown in FIG. 8 with the cell 10 and mount shown in FIG. 9 demonstrates the advantages of the present invention. The cell 68 of FIG. 8 has a plate stack 78 which is axially compressed between rigid stops on a central rod 79 extending through the stack. The stack is held in position by a weld ring and also by axially extending terminals 81 and 82. The engagement of the stack with the axial terminals makes the cell more prone to failure by lateral vibration; moreover the central rod reduces cell capacity for a given plate diameter and can be a cause of electrical short-circuiting. Further, the axial location of the terminals substantially adds to the overall length of the cell; both this and the weight of the rod increase cell weight. Supporting the plate stack in accordance with the present invention facilitates positioning the terminals in non-axial positions.

As shown in FIGS. 8 and 9, because of its shortened length, the cell 10 fits farther into its sleeve than does cell 68, even though sleeve 72 is shorter than sleeve 69. This facilitates better control of the temperature of the cell while still reducing the volume of the cell and the metal sleeve.

Accordingly, a nickel-hydrogen cell of the present invention is smaller, lighter and more efficient than other known nickel-hydrogen cells of comparable capacity. Further, this is accomplished without affecting the size of the plate stack and without decreasing the overall capacity of the cell. Thus, the energy density of the cell is substantially increased.

Applicants do not intend to be bound by the specific embodiments as disclosed above. There are various alternate embodiments of the present invention which will provide the advantages of the specific embodiments disclosed. For example, the negative and positive terminals could both be located at the same end of the battery, both axially offset (see FIG. 7). Such an embodiment of the present invention is apparent from the disclosure of the present invention, but is more radically different than nickel-hydrogen cells currently used, and therefore is less preferred. Accordingly, in light of the above, applicants intend to be bound only by the following claims:

We claim:

1. A metal-gas cell having a casing with a center portion and domed ends at opposite ends of the center portion, comprising:
   a plate stack within said casing and having two ends,
   plate stack support means carried by the casing and supporting one end of said stack,
   a spring exerting force on the other end of said plate stack opposite said support means and compressing said stack in an longitudinal axial direction, said spring comprising an arcuate spring which bears centrally on said plate stack, and
   a spring mounting means mounting the spring in fixed position in relation to said casing, said spring mounting means comprising a stop on the inside surface of the casing against which an edge portion of said spring is seated, said spring being external to the plate stack and located between the plate stack and said casing.

2. The cell of claim 1 wherein said spring is a Belleville washer having a diameter equal to that of the casing.

3. A metal-gas cell having a casing with a center portion and domed ends at opposite ends of the center portion, comprising:
   a plate stack within said casing and having two ends,
   plate stack support means carried by the casing and supporting one end of said stack,
   a spring exerting force on the other end of said plate stack opposite said support means and compressing said stack in an longitudinal axial direction, and
   first and second bus bars electrically connected to plates in said stack and extending on opposite sides of said stack between the stack and center portion of the casing, said spring extending between the two bus bars.

4. The cell of claim 3 wherein said bus bars are connected in tension between said spring and said stack support means.

5. A metal-gas cell having a casing comprising:
   a center portion with opposite domed ends,
   a plate stack within said casing,
   plate stack support means mounted by the casing and supporting one end of said stack,
   a spring exerting force on an end of said plate stack and compressing said stack in the longitudinal axial direction and against said stack support means,
   spring mounting means mounting the spring in fixed position in relation to said casing, said spring mounting means being external to the plate stack and mounted between the plate stack and said casing,
   two terminals to which said plate stack is electrically connected,
   said casing further including two inwardly extending sleeves, one each of said terminals extending through said sleeves and through said casing,
   said terminals each having a conical inner end portion and a threaded outer portion extended beyond said casing;
   a seal member between said terminal and said sleeve correspondingly tapered to the configuration of said inner end portion of said terminal, and
   means to pull said terminals through said sleeves, thereby compressing said seal against said sleeve sealing said casing.

6. A metal-gas cell comprising:
   a casing with a center portion, opposite domed ends, and an axis, said domed ends each having a midpoint,
   a plate stack within said casing having two ends,
   at least one terminal electrically connected to said plate stack,
   plate stack support means carried by the casing and supporting one end of said stack,
   a spring exerting force on the other end of said plate stack opposite said stack support means and compressing said stack in the longitudinal axial direction and toward said supported end, said spring being electrically isolated from said stack, and
   spring mounting means mounting the spring in fixed position in relation to said casing with said spring axially spaced from the midpoint of the nearer domed end, said spring mounting means being external to the plate stack and located between the plate stack and said casing.

7. The cell of claim 6 wherein said stack support means comprises a ring having a peripheral portion engaging and secured to said center portion of said casing, and
   one end of said plate stack engages a central portion of said ring.

* * * * *